(12) United States Patent
Chen

(10) Patent No.: US 9,262,097 B2
(45) Date of Patent: *Feb. 16, 2016

(54) SYSTEM AND METHOD FOR NON-VOLATILE RANDOM ACCESS MEMORY EMULATION

(71) Applicant: NETAPP, INC., Sunnyvale, CA (US)

(72) Inventor: Jyh-shing Chen, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,209

(22) Filed: Jul. 21, 2014

(65) Prior Publication Data

US 2014/0351492 A1 Nov. 27, 2014

Related U.S. Application Data

(63) Continuation of application No. 13/272,912, filed on Oct. 13, 2011, now Pat. No. 8,799,557.

(51) Int. Cl.
*G06F 9/455* (2006.01)
*G06F 12/06* (2006.01)
*G06F 3/06* (2006.01)

(52) U.S. Cl.
CPC ............ *G06F 3/0664* (2013.01); *G06F 3/0608* (2013.01); *G06F 3/0611* (2013.01); *G06F 3/0647* (2013.01); *G06F 3/0685* (2013.01); *G06F 3/0688* (2013.01); *G06F 9/455* (2013.01); *G06F 12/0638* (2013.01)

(58) Field of Classification Search
None
See application file for complete search history.

(56) References Cited

U.S. PATENT DOCUMENTS

| | | | |
|---|---|---|---|
| 2006/0069848 A1* | 3/2006 | Nalawadi | G06F 3/0605 711/103 |
| 2009/0313416 A1* | 12/2009 | Nation | G06F 12/0638 711/100 |
| 2014/0025877 A1* | 1/2014 | Talagala | G06F 12/0246 711/103 |

* cited by examiner

*Primary Examiner* — Kevin Verbrugge
(74) *Attorney, Agent, or Firm* — LeClairRyan, a Professional Corporation

(57) ABSTRACT

Described herein is a system and method for high speed non-volatile random access memory (NVRAM) emulation. The system and method may utilize a primary storage device and a volatile random access memory (RAM) device to emulate NVRAM functionality. The system and method may allocate a range of the primary storage device. The storage capacity or size of the allocated range may correspond or be at least partially based on a storage capacity or size of the volatile RAM device. Data, such as write requests, may be migrated from the primary storage device to the volatile RAM device. In the event of the unavailability, loss of power, or other such circumstances of the volatile RAM device, data from the volatile RAM device may be migrated back to the previously allocated range of the primary storage device.

20 Claims, 8 Drawing Sheets

| SEGMENT | SIZE | HOST | ALLOCATED RANGE | PRIMARY STORAGE DEVICE |
|---|---|---|---|---|
| 1 | 1 GB | SYSTEM 1 | DATA BLOCK 0–100 | DEVICE 1 |
| 2 | 2GB | SYSTEM 2 | DATA BLOCK 10-40; DATA BLOCK 50-200 | DEVICE 2 |

FIG. 8

SYSTEM AND METHOD FOR NON-VOLATILE RANDOM ACCESS MEMORY EMULATION

CROSS-REFERENCE TO RELATED APPLICATIONS

This application is a continuation of, claims the benefit of and priority to, previously filed U.S. patent application Ser. No. 13/272,912 entitled "System and Method for Non-Volatile Random Access Memory Emulation" filed on Oct. 13, 2011, the subject matter of which is hereby incorporated by reference in its entirety.

FIELD OF THE INVENTION

Embodiments of the present invention relate to storage systems, and in particular, to non-volatile random access memory (NVRAM) emulation.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of storage objects, such as files and logical units (LUs). A known type of file system is a write-anywhere file system that does not overwrite data on disks. An example of a write-anywhere file system that is configured to operate on a storage system is the Write Anywhere File Layout (WAFL®) file system available from NetApp, Inc. Sunnyvale, Calif.

The storage system may be further configured to allow many servers to access storage objects stored on the storage system. In this model, the server may execute an application, such as a database application, that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected to provide a storage system architecture configured to service many servers. In some embodiments, the storage system architecture provides one or more aggregates, each aggregate comprising a set of one or more storage devices (e.g., disks). Each aggregate may store one or more storage objects, such as one or more volumes. The aggregates may be distributed across a plurality of storage systems interconnected as a cluster. The storage objects (e.g., volumes) may be configured to store content of storage objects, such as files and logical units, served by the cluster in response to multi-protocol data access requests issued by servers.

Each storage system (node) of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each storage system is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The storage systems of the cluster may be configured to communicate with one another to act collectively to increase performance or to offset any single storage system failure within the cluster. The cluster provides data service to servers by providing access to a shared storage (comprising a set of storage devices). Typically, servers will connect with a storage system of the cluster for data-access sessions with the storage system. During a data-access session with a storage system, a server may submit access requests (read/write requests) that are received and performed by the storage system.

Each storage system may receive write requests for storing or writing data to a large capacity storage device (e.g., disk). As the storage system receives further write requests the data in the large capacity storage device is updated to reflect the received write requests. For example, the write requests may be stored and accumulated until a Consistency Point, when the write requests are executed.

However, such large capacity storage devices typically cause performance limitations of the storage system. For example, large capacity storage devices typically comprise a low response time for client input/output (I/O) access requests (e.g., write requests). Thus, an effective method and system for providing higher response time for storage devices of a storage system is needed.

SUMMARY

The embodiments described herein provide a system and method for high speed non-volatile random access memory (NVRAM) emulation. In some embodiments, a functionality of a primary storage device (e.g., a large capacity storage device) may be used in conjunction with a functionality of a volatile random access memory (RAM) device to emulate a high speed NVRAM device. In general, an NVRAM device provides high response time for access requests but has a high cost per amount of storage space. A volatile RAM device may also provide a high response time for access requests, but the volatile RAM device may lose its data content if it loses power. A primary storage device, such as a disk device, may retain its data content even if the primary storage device loses power and has a low cost per amount of storage space. However, primary storage devices generally provide slower response times for access requests.

In some embodiments, an NVRAM emulation engine may be configured to use a primary storage device and a volatile RAM device to emulate NVRAM functionality. Typically, write requests (also referred to herein as write logs) for a storage system are stored in NVRAM. Since NVRAM comprises non-volatile memory, data stored in NVRAM may be retained in the event of a system shutdown or other unforeseen problem that may result in the loss of power to the NVRAM. As such, storing write requests in NVRAM may ensure the retention of the write requests following the loss of power to the NVRAM. However, NVRAM has a high cost per amount of storage space. The embodiments disclosed herein relate to emulating NVRAM functionality with other types of storage devices (e.g., a primary storage device and a volatile RAM device) so that NVRAM functionality is provided with a high response time for access requests but without the high cost per amount of storage space typically associated with NVRAM.

In some embodiments, the NVRAM emulation engine may receive a storage capacity value for a volatile RAM device. In some embodiments, the storage capacity value may be equal to or less than the amount of currently available storage capacity for the volatile RAM device. The NVRAM emulation engine may then allocate an address range in a primary storage device based on the storage capacity value received for the volatile RAM device.

In some embodiments, the NVRAM emulation engine may then receive write requests and store the write requests to the allocated address range of the primary storage device (rather than store the write requests to NVRAM). As such, the write requests may be stored in a predefined allocated range or section of the primary storage device that corresponds to the storage capacity value of the volatile RAM device. In some embodiments, the write requests may continue to be received and stored to the allocated range of the primary storage device until the volatile RAM device is accessible and ready for receiving write requests. At this point, the NVRAM emulation engine may migrate (copy and store) the write requests from the primary storage device to the volatile RAM device. For example, the NVRAM emulation engine may migrate all of the data from the allocated range of the primary storage device to the volatile RAM device when the volatile RAM device becomes accessible.

After migrating write requests from the primary storage device to the volatile RAM device, the NVRAM emulation engine may then receive further write requests and store the write requests to the volatile RAM device. At this point, write requests may be stored directly to the volatile RAM device without use of the primary storage device. Write requests may accumulate in the volatile RAM device until a Consistency Point, when the write requests may be executed onto storage devices. After the write requests have been executed, the write requests may be deleted. Thus, the NVRAM emulation engine may continually update the volatile RAM device by storing received write requests and deleting executed write requests.

In some embodiments, the NVRAM emulation engine may receive an event notification of a volatile RAM device event that has occurred. The event notification may indicate a status of the volatile RAM device. The event notification may indicate that the volatile RAM device, for example, has lost power, a loss of power is expected, is no longer accessible (offline), etc. In response to receiving the event notification, the NVRAM emulation engine may be configured to migrate the data (comprising write requests) from the volatile RAM device to the previously allocated address range on the primary storage device. In some embodiments, the NVRAM emulation engine may be configured to migrate a partial amount or all of the data from the volatile RAM device to the previously allocated address range of the primary storage device.

In some embodiments, the NVRAM emulation engine may receive a second event notification of another volatile RAM device event has occurred. The second event notification may indicate that the volatile RAM device, for example, has regained power, a regaining of power is expected, is again accessible (online), etc. In response to receiving the second event notification, the NVRAM emulation engine may be configured to migrate a partial amount or all of the data (write requests) from the previously allocated range on the primary storage device to the volatile RAM device.

In some embodiments, a single volatile RAM device may be divided or segmented into a plurality of volatile RAM device segments where each volatile RAM device segment is assigned to a particular storage system or primary storage device. For example, a storage system environment may comprise a plurality of storage systems where each storage system utilizes a separate primary storage device. An NVRAM emulation engine may receive the number of storage systems and divide or segment the volatile RAM device based on the received number of storage systems. Next, the NVRAM emulation engine may migrate data (e.g., write requests) from each of the separate primary storage devices to a corresponding volatile RAM device segment. In some embodiments, if a volatile RAM device event is received, then the data contents of each volatile RAM device segment may be migrated back to the allocated range of the corresponding separate primary storage device.

As such, the high speed NVRAM emulation system and method presents an operating advantage for a storage system environment. For example, timing critical data such as write requests may be stored within a volatile RAM device with faster access times. However, the volatility of the random access memory device may be mitigated by migrating the data to and from the random access memory device to a predefined allocated range or portion of a non-volatile primary storage device As such, faster access times of write requests may be realized with the utilization of the NVRAM emulation system and method.

BRIEF DESCRIPTION OF THE DRAWINGS

FIG. 8 is an exemplary non-volatile RAM storage data structure used in some embodiments.

DETAILED DESCRIPTION

Figure 1:
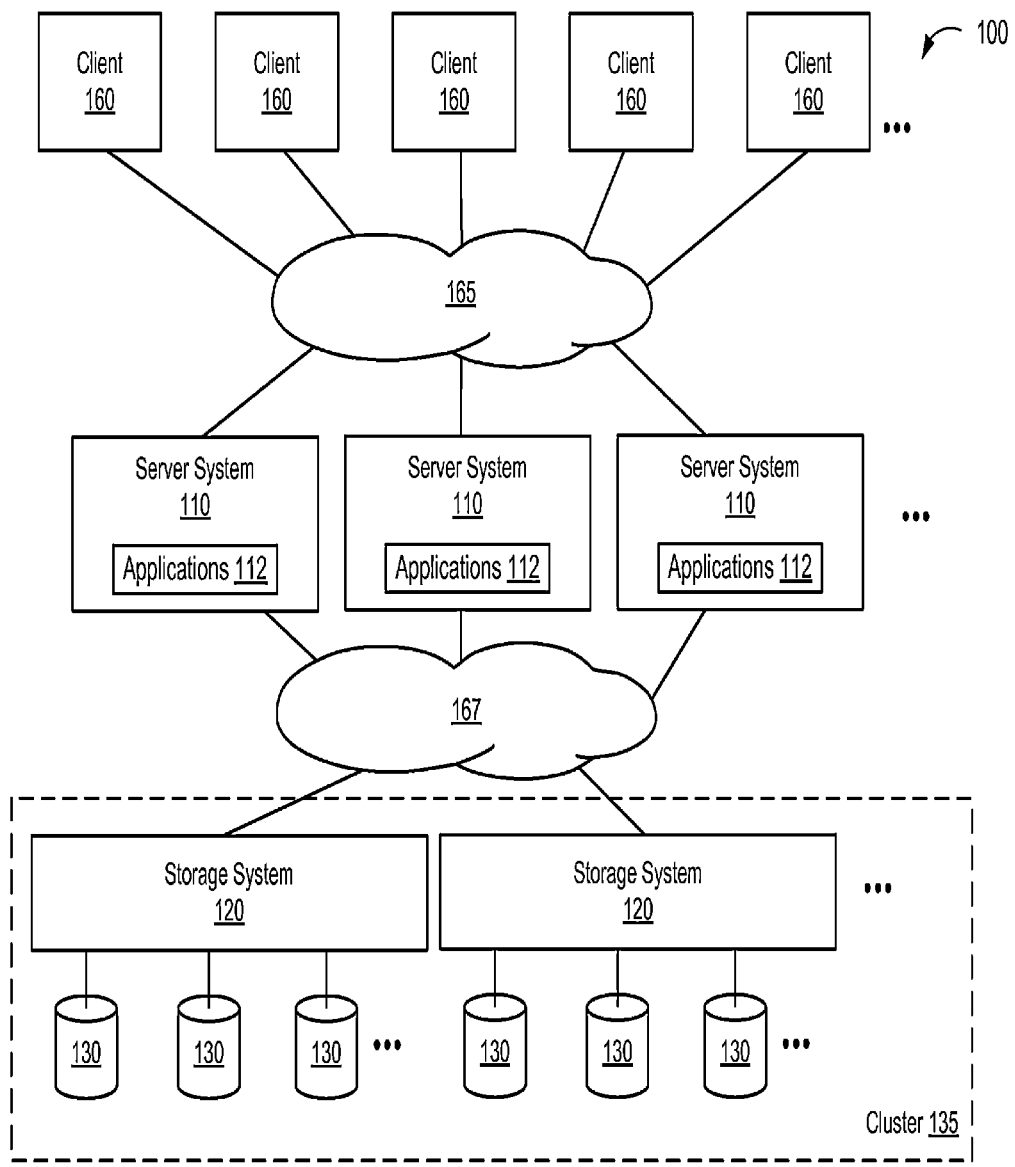
FIG. 1 is a schematic diagram of an exemplary distributed storage system environment in which some embodiments operate.

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into three sections. Section I contains terms used herein. Section II describes a cluster storage system environment in which some embodiments operate. Section III describes a system and method for high speed non-volatile RAM emulation.

I. Terms

Cluster storage system: As used herein, a cluster storage system may comprise a set of one or more storage systems. In some embodiments, the cluster may comprise one storage system. As such, the terms "cluster" and "storage system" may sometimes be used interchangeably. In other embodiments, a cluster comprises a plurality of storage systems.

Consistency Point: As used herein, a Consistency Point (CP) may refer to a write episode or point of a file system (e.g., a Write Anywhere File Layout) for performing a plurality of write requests of data blocks. As such, each CP may comprise a plurality of write requests such that each CP results in a consistent on disk file system image. In some embodiments, a WAFL system may log all incoming write allocation requests to a memory log. As such, the log comprising the write allocation requests may be used to determine which data blocks need to be updated or written to at a CP.

Hypervisor: As used herein, a hypervisor may refer to a virtual machine manager that allows multiple operating systems or applications to run concurrently on a host computer. A hypervisor may be referred to as a 'host.' In some embodiments, the hypervisor may present to a guest operating system a virtual operating system and manages the execution of the guest operating system. In some embodiments, multiple instances of a plurality of operating systems may share virtualized hardware (e.g., storage) resources. A hypervisor may be stored on a storage system or server.

Primary Storage Device: As used herein, a primary storage device may refer to a physical storage device that is not a RAM device for computer data storage. In some embodiments, a primary storage device is a non-volatile storage device. In some embodiments, a primary storage device may have a larger storage capacity than a RAM device and a slower access or response time than a RAM device. A primary storage device may comprise a writable storage device media, such as disk device, video tape, optical, DVD, magnetic tape, and any other similar media adapted to store information.

Random Access Memory (RAM) Device: As used herein, random access memory (RAM) device may refer to a physical device for computer data storage. In some embodiments, a RAM device may store data to be directly accessed in any (e.g., random) order. A RAM device may comprise volatile or non-volatile memory. For volatile RAM devices, the stored data is lost if the power to the RAM device is removed. For example, a volatile RAM device may store data, but if the volatile RAM device loses power, then the data may be erased or lost. For non-volatile RAM (NVRAM) devices, the stored data is not lost if the power to the NVRAM device is removed. Examples of RAM devices includes flash memory, Magnetic Random Access Memory (MRAM), Phase Change RAM (PRAM), etc.

II. Cluster Storage System Environment

FIG. 1 is a block diagram of an exemplary virtual server environment 100 in which some embodiments operate. The environment 100 may comprise a set of one or more server systems 110 connected to one or more client systems 160 via a network 165 and one or more storage systems 120. The server systems 110 may each access one or more storage systems 120 that are connected to the server systems 110 via a network 167. The one or more storage systems 120 comprise a cluster storage system 135. Each storage system 120 in the cluster 135 may comprise a set of storage devices 130 for storing client data, the storage devices 130 of the cluster 135 comprising a shared storage of the storage system 120. Note that the server systems 110 are also connected to each other (e.g., via network 167) for communicating with each other (e.g., for working collectively to provide data-access service to the client systems 160 and for collectively hosting a plurality of virtual machines as described herein).

A client system 160 may comprise a computer system that may interact with a server system 110 for submitting read/write access requests and for receiving or transmitting data from or to the server systems 110 over the network 165. In a virtual server environment, a client system 160 may interact over the network 165 with one or more virtual machines (VMs) executing on a server system 110 for submitting read/write access requests and for receiving or transmitting data from or to the storage system 120 over the network 167.

A server system 110 may comprise a computer system that may execute one or more applications 112 that interacts with the storage systems 120 and client systems 160 for receiving read/write access requests and receiving or transmitting data over the network 167 and the network 165. In some embodiments, a server system 110 may comprise a chassis hosting multiple instances of server systems 110, each server system 110 hosting multiple client systems embodied as virtual machines. The network 167 and/or subnets of networks 167 may be physically embodied within such a chassis.

An application 112 executing on a server system 110 may provide data-access services to client systems 160 by transmitting and processing access requests for data from the storage system(s) 120. In turn, an application 112 utilizes the services of the storage system 120 to access, store, and manage data in a set of storage devices 130. As such, a server system 110 may execute one or more applications 112 that submit access requests for accessing particular storage objects on the storage devices. Each application 112 may submit access requests for accessing particular storage objects on the storage systems of the cluster 135 and the cluster 135 may perform the received requests on the storage objects. An application 112 may comprises a non-virtual based application, such as a typical email exchange application or database application. In other embodiments, an application 112 may comprise a virtual-based application, such as a virtual machine (discussed below).

A storage system 120 may be coupled locally to a server system 110 over a network 167 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110 within a single chassis (e.g., a blade server chassis), with each instance of a server system 110 in communication with each other instance of a server system 110 in the chassis via network 167.

Interaction between the server systems 110 and the storage system(s) 120 can enable the provision of storage services. That is, the server systems 110 may request the services of the storage system(s) 120 (by submitting read/write access requests), and the storage system(s) 120 may respond to read/write access requests of the server systems 110 by receiving or transmitting data to the server systems 110 over the network 167 (e.g., by exchanging data packets through a connection over the network 167).

Communications between a storage system 120 and any of server systems 110 are typically embodied as packets sent over the computer network 167. A server system 110 may send an access request (a read/write access request) to the storage system 120 for accessing particular data stored on the storage system. The server system 110 may request the services of the storage system 120 by issuing storage-access protocol messages formatted in accordance with a conventional storage-access protocol for accessing storage devices (such as CIFS, NFS, etc.). Access requests (e.g., read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the server system 110 may issue access requests by issuing packets using block-based access protocols—such as the Fibre Channel Protocol (FCP), Fibre Channel over Ethernet (FCoE), or Internet Small Computer System Interface (iSCSI) Storage Area Network (SAN) access—when accessing data in the form of blocks.

Each application 112 executing on a server system 110 may utilize services of the cluster 135 to store and access its data. The storage system 120 may comprise a computer system that stores data in a set of one or more storage devices 130 as storage objects. A storage device 130 may comprise writable storage device media such as storage devices, video tape, optical devices, DVD, magnetic tape, flash memory, Magnetic Random Access Memory (MRAM), Phase Change RAM (PRAM), or any other similar media adapted to store information (including data and parity information).

As known in the art, a storage device 130 may comprise storage objects comprising one or more storage volumes, where each volume has a file system implemented on the volume. A file system implemented on the storage devices 130 may provide multiple directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical units (LUs).

Figure 2:
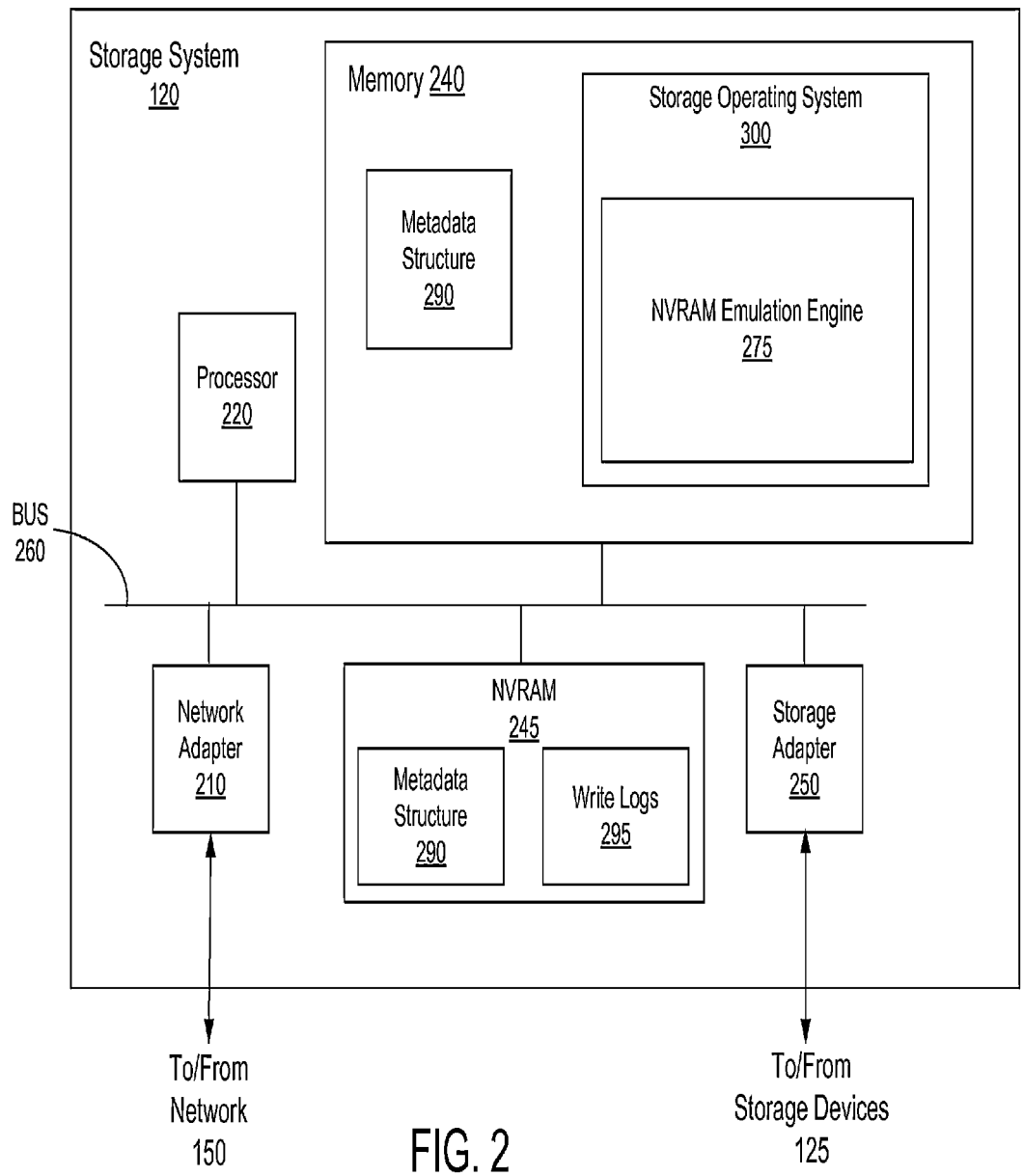
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 245, and a storage adapter 250 interconnected by a system bus 260. The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets). In some embodiments, the storage adapter 250 and the network adapter 210 may comprise a single unified target adapter (UTA) that may be used to perform the functionality of both the storage adapter 250 and the network adapter 210.

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. In some embodiments, the NVRAM 245 may comprise an emulated non-volatile RAM storage functionality as described in further detail below. As such, the NVRAM 245 may comprise functionality emulated by a primary storage device and a volatile RAM device. The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array having either a back-up battery, or other built-in last-state-retention capabilities (e.g. a FLASH memory), which holds the last state of the memory in the event of any power loss to the array. Therefore, even if an access request stored in memory 240 is lost or erased (e.g., due to a temporary power outage) it still may be recovered from the NVRAM 245. The write logs or write requests 295 may be stored, for example, to the NVRAM 245 (as shown in FIG. 2).

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including an NVRAM emulation engine) that are executed by the processor 220. In some embodiments, the NVRAM emulation engine 275 is implemented to emulate an NVRAM. Portions of the storage operating system 300 are typically resident in memory 240. It will be apparent to those skilled in the art, however, that other processing and memory means, including various computer readable media, may be used for storing and executing program instructions pertaining to the storage operating system 300.

In some embodiments, a metadata structure 290 is also resident in memory 240. In other embodiments, the metadata structure 290 may also be resident in NVRAM 245 or stored on a storage device 125. As discussed below, in some embodiments, the metadata structure 290 is produced and used by the NVRAM emulation engine 275 to store metadata for emulating an NVRAM based storage.

The storage adapter 250 cooperates with the storage operating system 300 executing on the storage system 120 to access data requested by the server system 110. The data may be stored on the storage devices 125 that are attached, via the storage adapter 250, to the storage system 120 or other node of a storage system as defined herein. The storage adapter 250 includes input/output (I/O) interface circuitry that couples to the storage devices 125 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data may be formatted into a packet and returned to the server system 110.

In an illustrative embodiment, the storage devices 125 may comprise disk devices that are arranged into a plurality of volumes, each having a file system associated therewith. In some embodiments, the storage devices 125 comprise disk devices that are configured into a plurality of RAID (redundant array of independent disks) groups whereby multiple storage devices 125 are combined into a single logical unit (i.e., RAID group). In a typical RAID group, storage devices 125 of the group share or replicate data among the disks that may increase data reliability or performance. The storage devices 125 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 125 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

III. High Speed NVRAM Emulation

Figure 3:
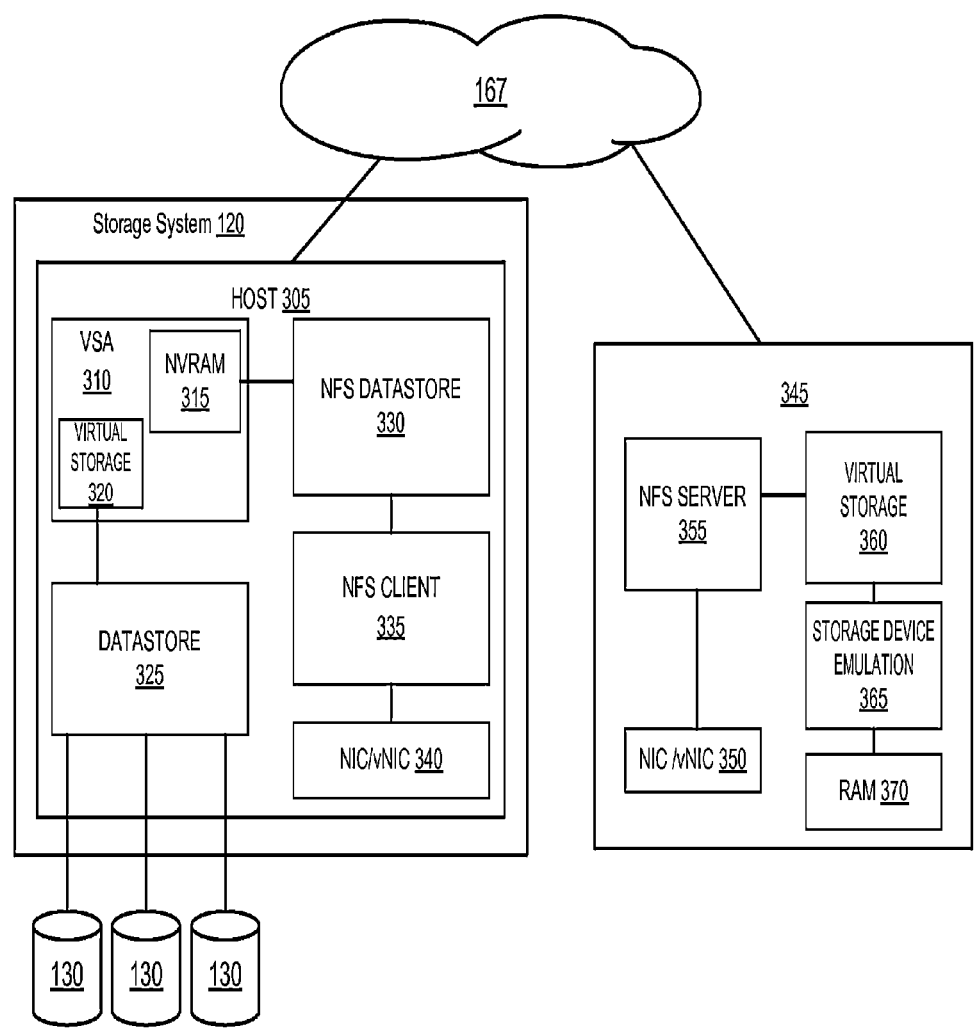
FIG. 3 is a schematic block diagram of an exemplary high speed non-volatile RAM emulation environment in which some embodiments operate.

FIG. 3 is a schematic block diagram of an exemplary high speed non-volatile RAM emulation environment. The host 305 (e.g., a hypervisor such as ESX®) may be supported on a hardware platform such as a storage system 120. The host 305 may comprise a virtual storage appliance (VSA) 310. In some embodiments, the VSA 310 may comprise a separate and discrete hardware component specifically designed to provide a specific computing resource (e.g., storage) on a dedicated hardware platform (e.g., the storage system 120). In general, the host 305 may not comprise an NVRAM card typically found in a hardware based storage controller. Instead, the host 305 may utilize a virtual storage device to emulate the functionality of NVRAM. Further details with regard to the emulation of NVRAM are discussed in further detail below.

In some embodiments, the VSA 310 may be comprised within the host 305. The VSA 310 may comprise an NVRAM 315 (e.g., an emulated NVRAM) and a virtual storage device (e.g., a physical storage device). As seen in FIG. 3, the host 305 may further comprise a datastore 325 (e.g., a data repository of one more storage devices) based on one or more storage devices 130 (e.g., physical storage devices such as a primary storage device). The host 305 may further comprise a Network File System (NFS) datastore 330 based on a virtual storage device 320 (e.g., a virtual disk). The NVRAM 315 may be emulated by using a primary storage device (e.g., storage device 130) and a volatile RAM device 370. The emulation of the NVRAM may utilize the NFS datastore. The NFS datastore 330 may be coupled to an NFS client 335, which is coupled to a Network Interface Card (NIC) 340 (e.g., a virtual network interface card) to establish a communication interface with another physical machine or virtual machine 345 for communication over the network 167. The network 167 may comprise either a physical network or a virtual network.

As seen in FIG. 3, the physical machine or virtual machine 345 comprises a NIC 350 and an NFS server 355 coupled to a volatile random access memory device based virtual storage device (e.g., a volatile RAM based virtual disk) 360. A storage device emulation module 365 may provide the virtualization of a volatile RAM device, as discussed in further detail below. The physical or virtual machine 345 may comprise a volatile RAM device 370. In general, the host 305 may not comprise a volatile RAM device or a capability of directly accessing a volatile RAM device. However, the host 305 may emulate NVRAM functionality by establishing a connection to a physical or virtual machine 345 that comprises a volatile RAM device and by using a primary storage device 130.

Figure 4:
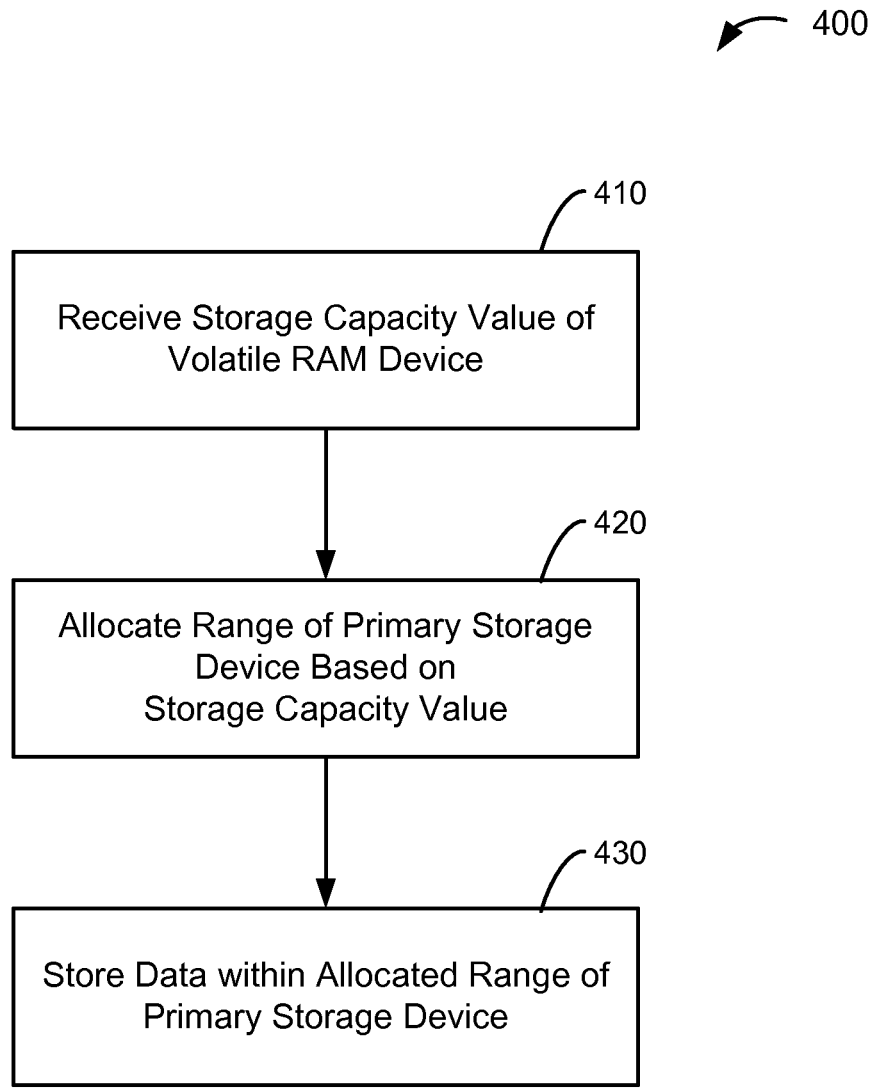
FIG. 4 is a flowchart of a method for allocating a range of a primary storage device and storing data within the allocated range in accordance with some embodiments.

FIG. 4 is a flowchart of a technique 400 for allocating a range of a primary storage device and storing data within the allocated range of the primary storage device. In general, the technique 400 allocates a range of a primary storage device or a range of data blocks of the primary storage device based on a storage capacity value. In some embodiments, the storage capacity value may comprise less than or equal to the amount of storage capacity of a volatile RAM device to be used in the emulation of the NVRAM. In some embodiments, the host 305 of a storage system 120 may perform the technique 400. The technique 400 is described in relation to FIG. 3, which conceptually illustrates the steps of the technique 400. In some embodiments, the technique 400 may receive information about available ranges of at least one storage device that may be available for allocation as well as an available storage capacity of a volatile RAM device for emulation and may allocate a portion of the at least one primary storage device automatically, without human initiation, interaction, or intervention. In some embodiments, particular steps of the technique 400 may be performed automatically, without human initiation, interaction, or intervention, while other steps of the technique 400 may be performed with human interaction.

In some embodiments, some of the steps of technique 400 are performed or caused to be performed by an NVRAM emulation engine 275 on a storage operating system 300 of a storage system 120. The NVRAM emulation engine 275 may be configured to operate in conjunction with other software modules of the storage system 120, server system 110, and software modules of the storage operating system 300 to collectively perform the embodiments described herein.

The technique 400 begins by receiving (at step 410) a size of a volatile RAM storage or a volatile RAM device. For example, the technique 400 may receive a storage capacity value less than or equal to the size of an available volatile RAM device. The storage capacity value may be received from an operating system (e.g., storage operating system 300 of a storage system 120). In some embodiments, the technique 400 may receive the size of an available volatile RAM device from a physical machine or virtual machine 345.

The technique 400 may further allocate (at step 420) a range of a primary storage device (e.g., at least one storage device 130) based on the received storage capacity value of the volatile RAM device. For example, the technique 400 may receive information (e.g., the storage capacity value) that the size of the available volatile RAM storage comprises 5 gigabytes (GB). As such, the technique 400 may allocate a range of the primary storage device that corresponds to 5 gigabytes. In some embodiments, the allocated range of the primary storage device may comprise allocating data blocks of the primary storage device where the data blocks are neighboring data blocks (e.g., data blocks comprising a continuous segment or address range of a storage device and/or adjoined data blocks of a primary storage device). In some embodiments, the allocated range of the primary storage device may comprise allocating data blocks of the primary storage device where the data blocks are not neighboring data blocks (e.g., data blocks from various portions of the primary storage device may be allocated until the total allocation of data blocks corresponds to the storage capacity value of the volatile RAM device). As such, the allocated data blocks of the primary storage device may comprise continuous data blocks (e.g., data blocks of a primary storage device within a single address range of the primary storage device) or discontinuous data blocks (e.g., data blocks of a primary storage device that are within a plurality of different address ranges of the primary storage device) of the primary storage device. Thus, in some embodiments, the allocated range of data blocks of the primary storage device may correspond or be at least partially based on the size or capacity (e.g., storage capacity value) of the volatile RAM device.

Figure 5:
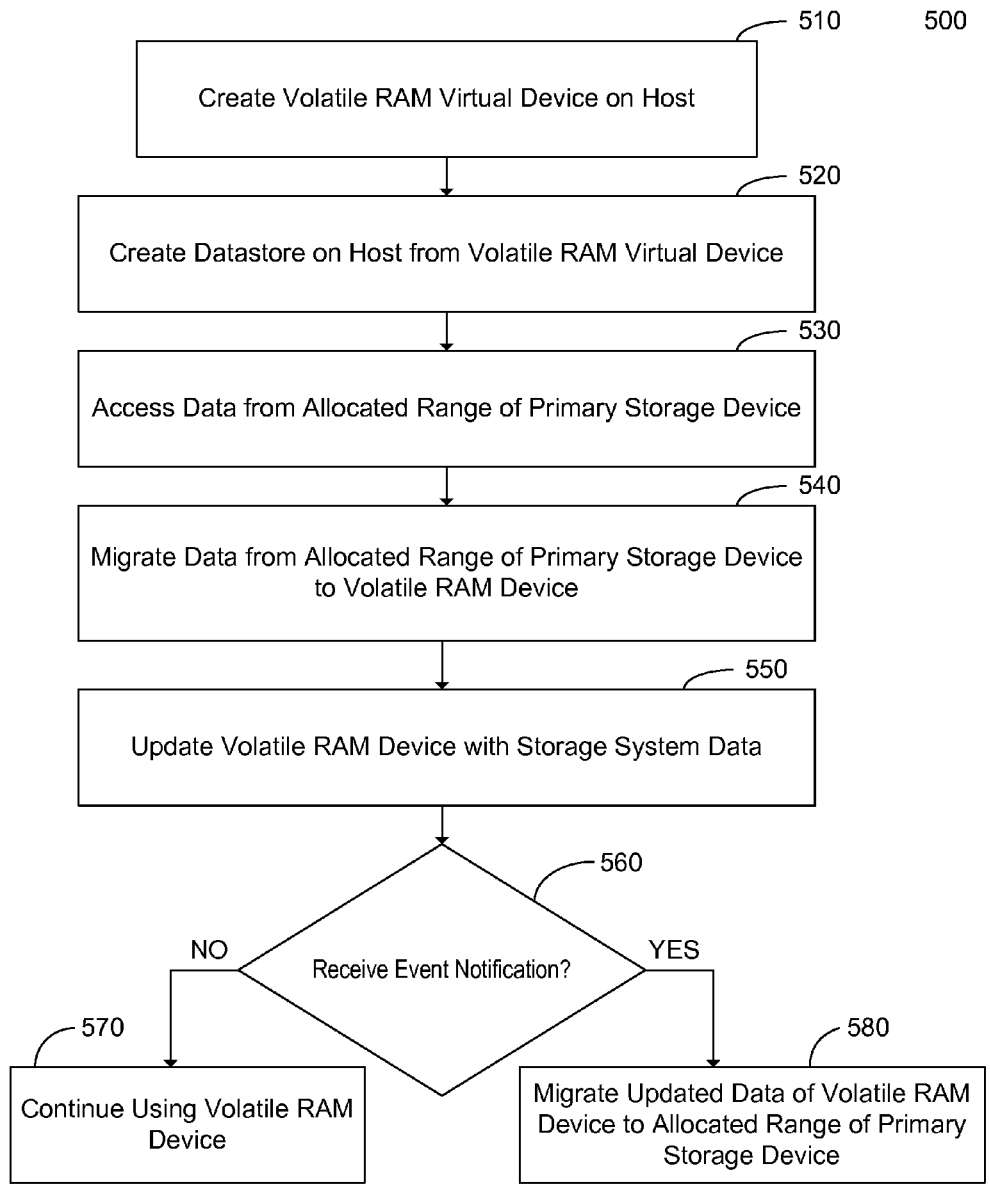
FIG. 5 is a flowchart of a method for migrating data from an allocated range of a primary storage device to a volatile RAM device in which some embodiments operate.

FIG. 5 is a flowchart of a technique 500 for migrating data from an allocated range of a primary storage device to a volatile RAM device and from the volatile RAM device to the allocated range of the primary storage device. In general, the technique 500 may emulate or virtualize a NVRAM device by migrating data between a primary storage device (e.g., a non-volatile large capacity storage device) and a volatile RAM device.

In some embodiments, some of the steps of technique 500 are performed or caused to be performed by the NVRAM emulation engine 275 on a storage operating system 300 of a storage system 120. The NVRAM emulation engine 275 may be configured to operate in conjunction with other software modules of the storage system 120, server system 110, and software modules of the storage operating system 300 to collectively perform the technique 500 as disclosed herein.

The technique 500 may migrate data from the allocated range of the primary storage device to the volatile RAM device. In some embodiments, if an event notification is received, then data (e.g., write requests) from the RAM device is migrated from the volatile RAM device to the allocated range of the primary storage device.

As seen in FIG. 5, the technique 500 may create (at step 510) a volatile RAM based virtual storage on a host 305. In some embodiments, the volatile RAM based virtual storage may be based on a volatile RAM device on another physical machine or virtual machine (e.g., the machine 345). For example, the host 305 may not comprise a non-volatile random access memory (NVRAM) card found on another hardware based storage controller. However, the host 305 may use the technique 500 to emulate the functionality of the NVRAM. The creation of an emulated NVRAM storage may comprise powering on the host 305 that contains the virtual storage appliance 310, powering on the virtual storage appliance 310 and waiting for the virtual storage appliance to complete booting, powering on the physical machine or virtual machine 345 that will service the NFS based volatile RAM device 370, and creating a datastore on the host 305 from the NFS based volatile RAM device.

As such, the technique 500 may create an emulated NVRAM storage based on a volatile RAM device on another physical machine or virtual machine (e.g., a virtual machine on another physical machine or the same machine as the host 305) and a primary storage device. The volatile RAM based virtual storage of the host 305 may communicate and/or establish a connection to the backing volatile RAM device through the use of an NFS client, NIC or vNIC, and NFS Server as depicted in FIG. 3.

The technique 500 may further create (at step 520) a datastore on the host system. For example, the datastore of the host 305 may comprise an NFS datastore with a volatile RAM based virtual storage device from the volatile RAM device from the physical machine or virtual machine 345. In some embodiments, the datastore may comprise an aggregate of one or more available storage devices. For example, the datastore of the host 305 may comprise an aggregate comprising the volatile RAM based virtual storage based on the volatile RAM device. The technique 500 may then access (at step 530) data from the allocated range of the primary storage device or devices (e.g., the storage device 130). For example, a primary storage device may comprise data (e.g., write requests, instructions, and/or transactions) within an allocated range of the primary storage device. In some embodiments, the allocated range may be created in accordance with FIG. 4. Next, the technique 500 may migrate (at step 540) data from the allocated range of the primary storage device to the datastore comprising the volatile RAM based virtual storage. In some embodiments, the migration of the data comprises transferring or copying data from the allocated range of the primary storage device to the volatile RAM device on the physical machine or virtual machine 345. For example, data may be migrated or transferred from the primary storage device to the host 305 to an NFS datastore comprising a volatile RAM based virtual storage, through an NFS client and a NIC or vNIC to a NIC or vNIC of another physical machine or virtual machine, NFS server, volatile RAM based virtual device, and finally into a volatile RAM device. In some embodiments, the migration of the data may be performed by VMware® storage vMotion® storage migration from a primary storage device based virtual storage to the datastore that comprises the NFS based volatile RAM device.

As such, the technique 500 may migrate data from the allocated range of a primary storage device to a volatile RAM device. The technique 500 may then update (at step 550) the contents of the volatile RAM device. For example, in some embodiments, a storage system 120 may receive write requests, transactions, or instructions. A write request may comprise a request to store data on a storage device coupled to the storage system. For example, a write request may comprise a request to store additional client data onto the primary storage device. In some embodiments, the write request may comprise a request to store data on the primary storage device.

As such, in some embodiments, a storage system may receive additional data requests to write data to at least one storage device. In some embodiments, as a write request is received, the write request is stored as data into the volatile RAM device. As such, received write requests are stored onto a volatile RAM device after data (e.g., write requests) have been migrated from the allocated range of the primary storage device to the volatile RAM device. In some embodiments, a storage system may accumulate or store additional write requests until a Consistency Point where the storage system may then execute write requests. As such, in some embodiments, after a write request has been executed, the write request may be removed or deleted from the volatile RAM device. As such, the contents of the volatile RAM device may be updated to store received write requests and the contents of the volatile RAM device may be updated to remove or delete executed write requests.

As seen in FIG. 5, the technique 500 may receive (at step 560) an event notification. In some embodiments, the event notification may be received from a storage operating system 300 of a storage system 120. The event notification may comprise a notification that a volatile RAM device event has occurred. In some embodiments, the event notification event may correspond to a status of the volatile RAM device. In some embodiments, an event notification may indicate that a volatile RAM device may be inaccessible due to a shut down or powering down of a physical machine comprising the volatile RAM device. In some embodiments, the RAM device event may comprise a shut down or powering down of a virtual machine comprising or coupled to the volatile RAM device. As such, the event notification may indicate a status of the physical machine or virtual machine associated with the volatile RAM device. If the physical machine or virtual machine has a power failure, then the power failure may constitute a volatile RAM device event. Thus, the volatile RAM device event may comprise an event that results in a loss of access or connection from the host (e.g., host 305) to another physical machine or virtual machine associated with the volatile RAM device. In some embodiments, the volatile RAM device event may comprise an event resulting in the loss of connection or ability of the storage system to update the data (e.g., read requests and/or write requests) of the volatile RAM device.

In some embodiments, if an event notification is not detected or received, then the technique 500 may continue using (at step 570) the volatile RAM device. As such, the data (e.g., write requests) stored on the volatile RAM device may continue to be updated write requests are received and executed. However, if an event notification has been detected or received, then the technique 500 may migrate (at step 580) the data or contents of the volatile RAM device to the allocated range of the primary storage device. In some embodiments, if an event notification corresponding to a loss of power to the volatile RAM device is received, a backup power source may be used to at least temporarily provide power to the volatile RAM device at least until the data or contents of the volatile RAM device have been migrated to the allocated range of the primary storage device. As such, if an event notification has been received, the contents of the volatile RAM device may be migrated to the allocated range of the primary storage device of the host and further updating (e.g., write requests) may be stored or deleted from the allocated range of the primary storage device of the host.

In some embodiments, such updating of the allocated range of the primary storage device of the host may continue until the volatile RAM device is available again and migration of the data of the allocated range of the primary storage device are migrated to the volatile RAM device. For example, a second event notification may be received. The second event notification may indicate a status of the volatile RAM device. For example, the event notification may indicate that the volatile RAM device has its power restored, a restoring of power is expected, the volatile RAM device is again accessible (online), etc. In response to receiving the second event notification, the data in the previously allocated range of the primary storage device may be migrated back to the volatile RAM device.

Figure 6:
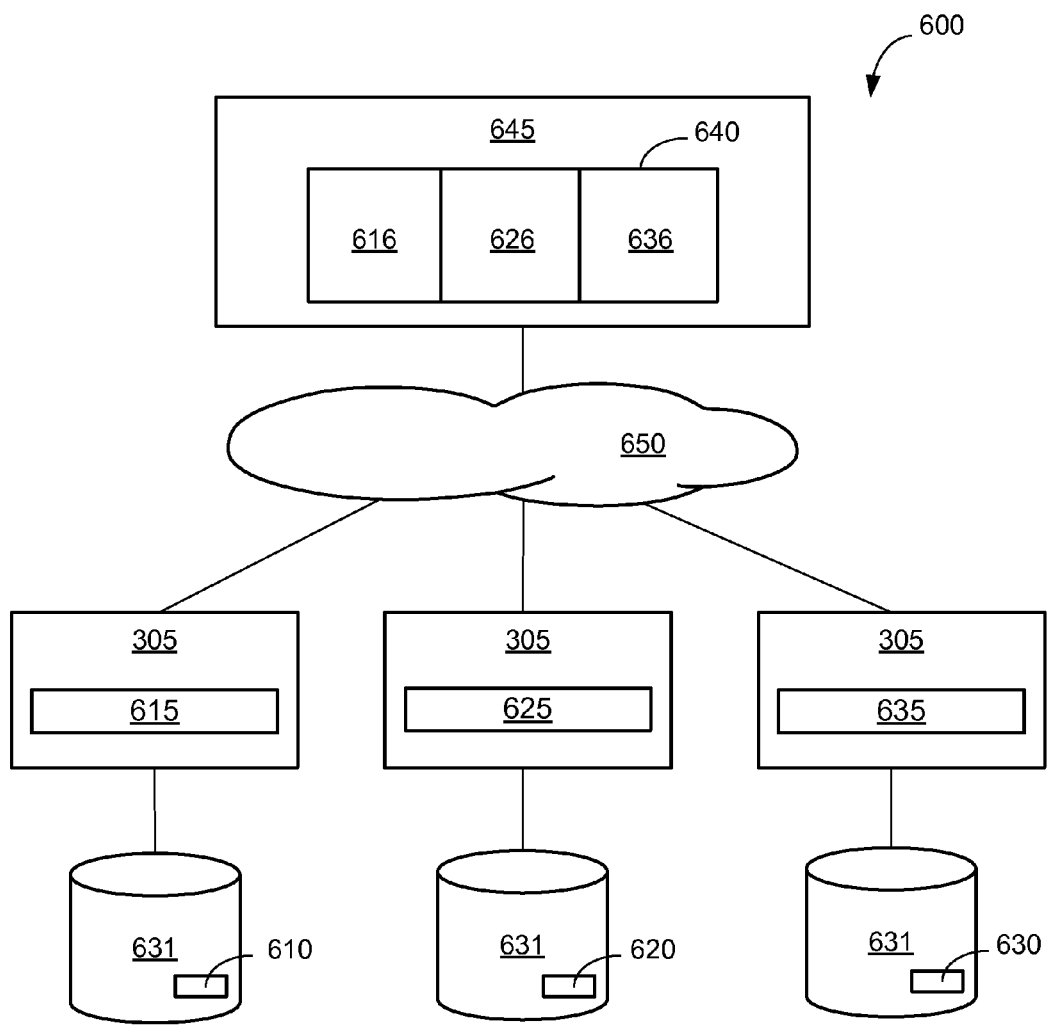
FIG. 6 is a schematic block diagram of an exemplary configuration of a plurality of storage system hosts using a volatile RAM device from a single physical machine.

FIG. 6 is a schematic block diagram of a configuration 600 of a plurality of storage system hosts using a volatile RAM virtual storage based on a volatile RAM device from a single physical or virtual machine. In general, configuration 600 comprises a plurality of storage system hosts 305. In some embodiments, each storage system host 305 may utilize an emulated NVRAM based storage (e.g., utilizing a primary storage device and a volatile RAM device). For example, the storage system hosts 305 may comprise a volatile RAM based virtual storage 615, 625, and 635 such that each of the volatile RAM based virtual storage 615, 625, and 635 is comprised within a separate storage system host 305. Moreover, in some embodiments, each storage system host 305 may be coupled to a primary storage device 631. In some embodiments, each primary storage device 631 may comprise an allocated range for storing data (e.g., write requests), as described above with relation to FIG. 4. Each of the storage system hosts 305 may further be coupled to or communicate with a volatile RAM device card machine 645 over a network 650. The volatile RAM device card machine 645 may comprise a volatile RAM device card that allows access to a volatile RAM device 640. In some embodiments, the volatile RAM device 640 may be configured to store and update data from the allocated range of a primary storage device 631 of each storage system host 305. For example, a first storage system host 305 may store data (e.g., write requests) in a primary storage device 631 at an allocated range 610 of data blocks. A second storage system host 305 may store data (e.g., write requests) in another primary storage device 631 at an allocated range 620 of data blocks. Similarly, a third storage system host 305 may store data (e.g., write requests) in a separate primary storage device 631 at an allocated range 630 of data blocks. Each storage system host 305 may migrate data from the allocated range of its primary storage device 631 to a respective volatile RAM based virtual storage 615, 625, and 635. In some embodiments, each of the volatile RAM based virtual storage 615, 625, and 635 is based on a volatile RAM device 640 of the volatile RAM device card machine 645. For example, the volatile RAM device 640 may be partitioned or divided into segments or blocks corresponding to each volatile RAM based virtual storage 615, 625, and 635. For example, the segment 616 of the volatile RAM device 640 may be used for the storing of data after the migration of data from the allocated range 610 of data blocks to the volatile RAM based virtual storage 615, the segment 626 of the RAM device 640 may be used for the storing of data after the migration of data from the allocated range 620 of data blocks to the volatile RAM based virtual storage 625, and the segment 636 of the volatile RAM device 640 may be used for the storing of data after the migration of data from the allocated range 630 of data blocks to the volatile RAM based virtual storage 635.

As such, the configuration 600 comprises a plurality of storage system hosts to migrate data from an allocated range of data blocks from a first primary storage device (e.g., a storage device 130) to a virtual storage device (e.g., the volatile RAM virtual storage) based on a volatile RAM device. Thus, the combination of the primary storage device in conjunction with the volatile RAM device may emulate NVRAM functionality. In some embodiments, each of the allocated ranges of data blocks associated with each of the storage system hosts may be created based on a number less than or equal to the capacity of the volatile RAM device and/or the number of storage system hosts to be using the volatile RAM device.

Figure 7:
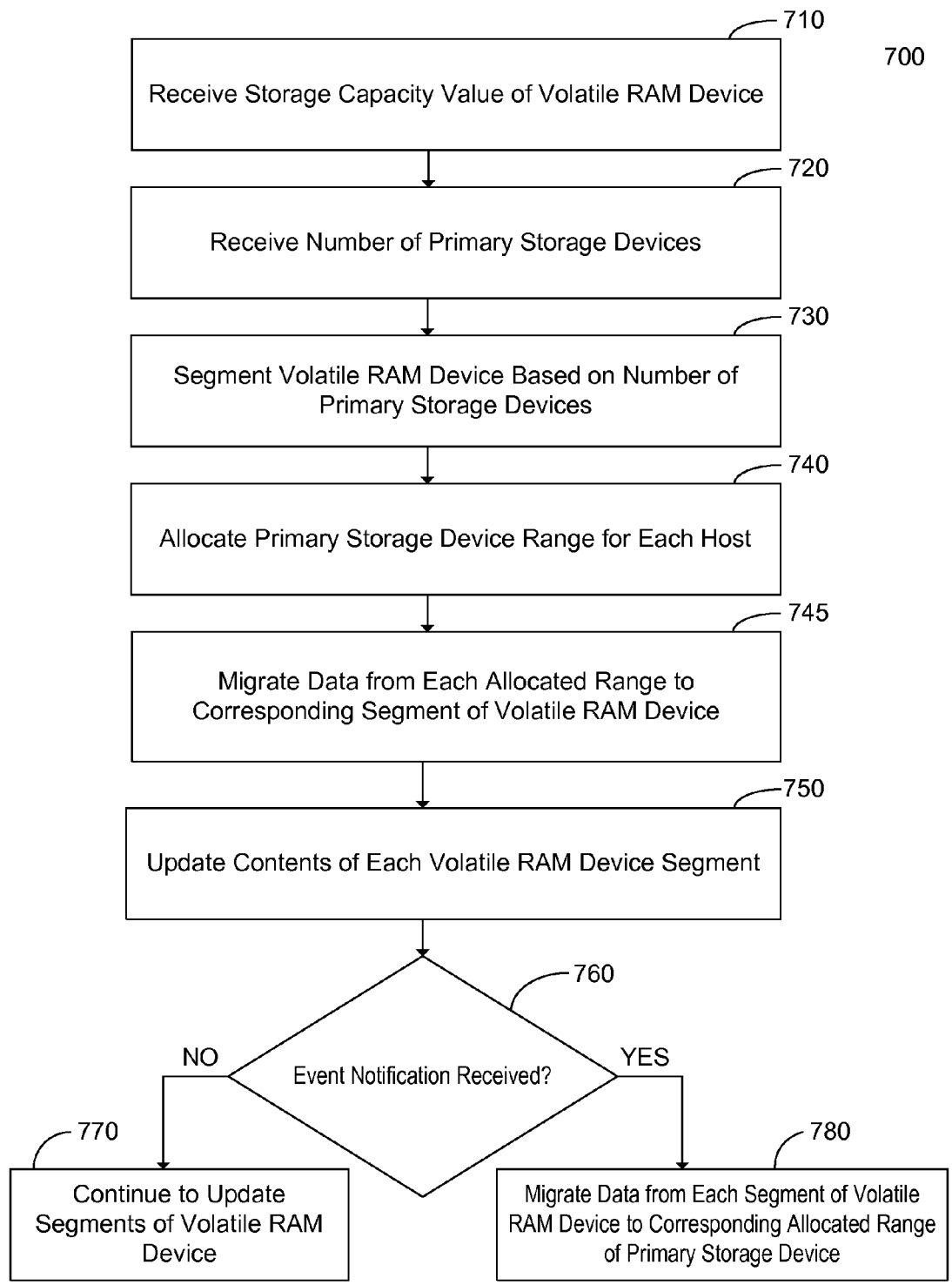
FIG. 7 is a flowchart of a method for allocating a range of a primary storage device and migrating data from the allocated range of the primary storage device.

FIG. 7 is a flowchart of a technique 700 for allocating a range of a primary storage device and migrating data from the allocated range of the primary storage device. The technique 700 may receive (at step 710) a storage capacity value of a volatile RAM device. For example, the storage capacity value may correspond to less than or equal to the size of a volatile RAM device that is available to store data. The technique 700 may further receive (at step 720) the number of supported storage system hosts or number of supported primary storage devices. In some embodiments, each supported storage system host may comprise a separate allocated range of data blocks on a primary storage device for storing data (e.g., write requests) to be migrated to a volatile RAM device. In some embodiments, the technique 700 may allocate (at step 730) storage or capacity from the volatile RAM device based on the number of supported storage system hosts or supported primary storage devices. For example, the technique 700 may segment at least a portion of the capacity of the volatile RAM device into one or more segments (e.g., segments 616, 626, and 636). In some embodiments, each segment may comprise an identical size or capacity, but in other embodiments the segments may comprise different sizes or capacities. The technique 700 may allocate (at step 740) the allocated range of data blocks for each primary storage device. In some embodiments, the allocation of the range of data blocks is based on the total size or capacity of the volatile RAM device and the number of supported primary storage devices. For example, if the volatile RAM device comprises 5 gigabytes and there are 5 supported primary storage devices, then each allocated range of data blocks for each primary storage device may comprise 1 gigabyte (e.g., 5 gigabytes of volatile RAM device capacity divided by the number of supported primary storage devices). As such, each of the supported storage system hosts may allocate a range of data blocks on corresponding primary storage devices where the range is dependent or based upon the size or capacity of the volatile RAM device and the number of supported primary storage devices.

As seen in FIG. 7, the technique 700 may then migrate (at step 745) data from each of the allocated range of data blocks for each of the supported primary storage devices to the volatile RAM device. For example, the technique 700 may migrate the data of the allocated range of data blocks of each supported primary storage device to a corresponding segment of the volatile RAM device. The migration of data may comprise copying data from a first location to a second location such that the data from the first location may be stored within the second location. The technique 700 may update (at step 750) the contents or data of each segment of the volatile RAM device. For example, a first storage system host may receive a write request to be stored. The method may store the write request in the segment of the volatile RAM device corresponding to the first storage system host or the first primary storage device. In some embodiments, if a write request has been executed, then the write request may be removed or deleted from the corresponding segment of the volatile RAM device. The method may receive (at step 760) an event notification of the volatile RAM device as previously described. If an event notification has not been received, then the technique 700 may continue to update (at step 770) the corresponding segment of the volatile RAM device. However, if an event notification has been received, then the technique 700 may migrate (at step 780) data from each segment of the volatile RAM device to the allocated range of data blocks of each segment's corresponding supported primary storage device.

FIG. 8 shows an exemplary NVRAM storage data structure 800 used in some embodiments. In some embodiments, the NVRAM storage data structure 800 comprises a plurality of dataset entries 860, each dataset entry 860 representing a volatile RAM segment identifier, size, storage system host identifier, allocated range of data blocks of a primary storage device, and a primary storage device (discussed below). Each entry 860 may comprise a plurality of data fields for storing data describing or identifying the volatile RAM device segments and sizes, storage system hosts, and corresponding allocated range of data blocks on primary storage devices.

In some embodiments, an NVRAM storage structure entry 860 representing a segment of a volatile RAM device may contain data fields for a volatile RAM device segment 810, RAM device segment size or capacity 820, storage system host 830, allocated range of data blocks 840 of a primary storage device, and primary storage device 850. The volatile RAM device segment identifier 810 may comprise information identifying a segment of the volatile RAM device. For example, the volatile RAM device segment identifier 810 may comprise a name or address range of a volatile RAM device.

The volatile RAM device segment size 820 may specify the size of the segment of the volatile RAM device. For example, the volatile RAM device segment size 820 may specify that a segment of the volatile RAM device comprises a capacity of 1 gigabyte or 2 gigabytes. Storage system host identifier 830 may identify a supported storage system host for a segment. For example, each supported storage system host may be associated with or correspond to a segment of the volatile RAM device.

Allocated range identifier 840 may indicate or specify the allocated range of data blocks of a primary storage device for each storage system host. In some embodiments, the allocated range identifier 840 may comprise a continuous segment of data blocks. In the same or alternative embodiments, the allocated range identifier 840 may comprise information indicating a plurality of discontinuous ranges of data blocks. The primary storage device identifier 850 may identify the specific storage device that comprises the allocated range of data blocks from a corresponding allocated range identifier 840.

In some embodiments, the volatile RAM device segment identifier 810, volatile RAM device segment size or capacity 820, storage system host identifier 830, allocated range identifier 840, and primary storage device identifier 850 may be generated or received when an allocated range of data blocks has been created for a storage system host or when data is migrated from a storage system host to a volatile RAM device. For example, the NVRAM storage data structure 800 may be updated whenever data is migrated from an allocated range of data blocks of a primary storage device to a volatile RAM device.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon in which may be used to control, or cause, a computer to perform any of the processes of an embodiment. The storage medium may include, without limitation, any type of device including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A system comprising:
at least one processor;
memory operatively coupled to the at least one processor, the memory comprising a non-volatile memory emulation engine to:
receive a storage capacity value of a volatile memory device, the storage capacity value indicating an available storage capacity of the volatile memory device,
allocate a portion of a storage device based at least partially on the storage capacity value,
store data to the allocated portion of the storage device,
migrate data stored in the allocated portion of the storage device to the volatile memory device, and
migrate data stored in the volatile memory device to the allocated portion of the storage device, in response to an event notification.

2. The system of claim 1, wherein the storage device comprises a non-volatile large capacity storage device having a larger storage capacity than the volatile device and a slower access time than the volatile memory device.

3. The system of claim 1, wherein the data stored in the volatile memory device comprises at least one write request, the non-volatile memory emulation engine is to further:
receive at least one additional write request,
store the at least one additional write request in the volatile memory device, and
remove the at least one write request from the volatile memory device, after the at least write request has been executed.

4. The system of claim 2, wherein the data stored in the volatile memory device comprises at least one write request, and the at least one write request comprises at least one request to store additional data to the storage device.

5. The system of claim 1, wherein the volatile memory device is operatively coupled to the storage device via a network and the non-volatile memory emulation engine is to migrate data between the storage device and the volatile memory device over the network.

6. The system of claim 1, wherein the event notification indicates unavailability of the volatile memory device.

7. The system of claim 6, wherein the non-volatile memory emulation engine is to further migrate the data from the allocated portion of the storage device to the volatile memory device, in response to another event notification indicating availability of the volatile memory device has been restored.

8. A computer-implemented method comprising:
receiving a storage capacity value of a volatile memory device, the storage capacity value indicating an available storage capacity of the volatile memory device;
allocating a portion of a storage device based at least partially on the storage capacity value of the volatile memory device;
storing data to the allocated portion of the storage device;
migrating data stored in the allocated portion of the storage device to the volatile memory device; and
migrating data stored in the volatile memory device to the allocated portion of the storage device, in response to an event notification.

9. The computer-implemented method of claim 8, wherein the storage device comprises a non-volatile large capacity storage device having a larger storage capacity than the volatile memory device and a slower access time than the volatile memory device.

10. The computer-implemented method of claim 8, further comprising:
updating contents of the volatile memory device to store at least one write request in the volatile memory device and remove the at least one write request from the volatile memory device after the at least one write request has been executed, wherein the data stored in the volatile memory device comprises the at least one write request.

11. The computer-implemented method of claim 10, wherein the contents of the volatile memory device are continuously updated, when the event notification has not been received or detected.

12. The computer-implemented method of claim 8, wherein the volatile memory device is operatively coupled to the storage device via a network and the migrating of the data between the storage device and the volatile memory device is performed over the network.

13. The computer-implemented method of claim 8, wherein the event notification indicates unavailability of the volatile memory device and corresponds to a power loss of the volatile memory device, a power down of the volatile memory device, or a shutdown of the volatile memory device.

14. The method of claim 8, further comprising migrating data stored in the allocated portion of the primary storage device to the volatile memory device, in response to another event notification indicating availability of the volatile memory device has been restored.

15. At least one non-transitory computer readable storage medium comprising instructions that, when executed, cause a system to:
receive a storage capacity value of a volatile memory device to indicate an available storage capacity of the volatile memory device;
allocate a portion of a storage device based at least partially on the storage capacity value;
store data to the allocated portion of the storage device;
migrate data stored in the allocated portion of the storage device to the volatile memory device; and
migrate data stored in the volatile memory device to the allocated portion of the storage device, in response to an event notification.

16. The at least one non-transitory computer readable storage medium of claim 15, wherein the instructions, when executed, further cause the system to update, continuously, contents of the volatile memory device, when the event notification is not received or detected.

17. The at least one non-transitory computer readable storage medium of claim 15, wherein the event notification corresponds to a power loss of the volatile memory device and indicates unavailability of the volatile memory device, and the system is to migrate data stored in the volatile memory device to the allocated portion of the storage device while a backup power source provides power to the volatile memory device.

18. The at least one non-transitory computer readable storage medium of claim 17, wherein the instructions, when executed, further cause the system to update, continuously, contents of the allocated portion of the storage device, in response to the event notification indicating the unavailability of the volatile memory device.

19. The at least one non-transitory computer readable storage medium of claim 18, wherein the instructions, when executed, further cause the system to migrate data stored in the allocated portion of the storage device to the volatile memory device, in response to another event notification indicating availability of the volatile memory device has been restored.

20. The at least one non-transitory computer readable storage medium of claim 15, wherein the volatile memory device comprises a virtual volatile memory device, the storage device is operatively coupled to the virtual volatile memory device via a virtual network, and the instructions, when executed, further cause the system to migrate data between the storage device and the virtual volatile memory device over the virtual network.

* * * * *